United States Patent
Kasai et al.

(10) Patent No.: US 8,334,754 B2
(45) Date of Patent: Dec. 18, 2012

(54) TAG COMMUNICATION DEVICE AND TAG COMMUNICATION METHOD

(75) Inventors: Hirokazu Kasai, Kyoto (JP); Takehiro Kawai, Muko (JP)

(73) Assignee: Omron Corporation, Kyoto (JP)

( * ) Notice: Subject to any disclaimer, the term of this patent is extended or adjusted under 35 U.S.C. 154(b) by 393 days.

(21) Appl. No.: 12/602,411

(22) PCT Filed: Mar. 17, 2008

(86) PCT No.: PCT/JP2008/054868
§ 371 (c)(1),
(2), (4) Date: Nov. 30, 2009

(87) PCT Pub. No.: WO2008/146520
PCT Pub. Date: Dec. 4, 2008

(65) Prior Publication Data
US 2010/0214073 A1    Aug. 26, 2010

(30) Foreign Application Priority Data
Jun. 1, 2007 (JP) ................ P2007-146996

(51) Int. Cl.
*H04Q 5/22* (2006.01)
(52) U.S. Cl. .......... 340/10.4; 340/5.1; 340/5.2; 340/5.3; 340/5.4; 340/5.5; 340/10.1; 340/10.2; 340/10.3; 340/10.5; 340/572.1; 340/572.2; 340/572.3; 340/572.4; 340/572.9; 235/375; 235/376; 235/377; 235/380; 235/381
(58) Field of Classification Search .... 340/572.1–572.9, 340/5.1–5.6, 10.1–10.6; 235/375–385; 455/73–88
See application file for complete search history.

(56) References Cited

U.S. PATENT DOCUMENTS

| | | | |
|---|---|---|---|
| 3,852,755 A | 12/1974 | Works et al. | |
| 4,595,915 A | 6/1986 | Close | |
| 6,084,530 A | 7/2000 | Pidwerbetsky et al. | |
| 6,566,997 B1 | 5/2003 | Bradin | |
| 2003/0137403 A1* | 7/2003 | Carrender et al. | 340/10.4 |
| 2005/0078029 A1 | 4/2005 | Okamura et al. | |

FOREIGN PATENT DOCUMENTS

| | | |
|---|---|---|
| JP | 2002-048863 A | 2/2002 |
| JP | 2006-099189 A | 4/2006 |
| JP | 2007-128390 A | 5/2007 |

OTHER PUBLICATIONS

European Patent Office extended search report on application No. 08722263.4 dated Feb. 25, 2011; 7 pages.
Japanese Patent Office action on application 2009-516202 mailed May 10, 2012, pp. 1-2.

* cited by examiner

*Primary Examiner* — George Bugg
*Assistant Examiner* — Ojiako Nwugo
(74) *Attorney, Agent, or Firm* — Foley & Lardner LLP

(57) ABSTRACT

To improve communication between tags by causing a mobile object having a RFID tag attached to transmit an interrogating wave only when moving in a communication range to reduce power consumption and prevent occurrence of tag confusion. By acquiring two Doppler signals from 2-frequency transmission waves (CW) with different frequencies and respective reflected waves and detecting phase difference from the Doppler signals, a cargo (21A) is detected to be moving in the communication range (A). Only when the movement is detected, a reader-writer (1A) transmits the interrogating wave (RW).

18 Claims, 10 Drawing Sheets

(a)

(b)

(c)

TAG COMMUNICATION DEVICE AND TAG COMMUNICATION METHOD

TECHNICAL FIELD

The present invention relates to tag communication devices and tag communication methods, and in particular, to a tag communication device and a tag communication method suited for reducing power consumption when wirelessly communicating with a mobile object with an RFID (Radio Frequency Identification) tag attached, and for preventing an occurrence of tag confusion.

BACKGROUND ART

In the field of physical distribution, an RFID system of attaching an RFID tag (hereinafter simply referred to as "tag") to a mobile object such as a cargo and performing wireless communication between the tag and a tag communication device such as a reader/writer is recently adopted, so that cargo management is carried out by such an RFID system. According to the RFID system, the reader/writer is installed along conveying means such as a belt conveyor, and an interrogating wave is transmitted from the reader/writer. A response wave is then transmitted from the tag attached to the cargo being conveyed by the belt conveyor and the like and data such as ID (Identification) is automatically read, and hence physical distribution work becomes more efficient than the related art.

However, in such an RFID system, the reader/writer detects presence of the tag with only the transmission of the interrogating wave. Thus, in order for the tag and the reader/writer to communicate, the interrogating wave needs to be transmitted on a steady basis regardless of whether or not the tag is in a communication range of the reader/writer. It is a waste of power to have the reader/writer transmit the interrogating wave on a steady basis. If a plurality of reader/writers is installed and the number of channels assigned to each reader/writer is few, radio interference may occur between the reader/writers or tag confusion may occur in the communication with the tag when each reader/writer transmits the interrogating wave, whereby a possibility of non-communication becomes high.

To solve such a problem, a system in which the reader/writer transmits the interrogating wave only when the tag is in the communication range instead of transmitting the interrogating wave on a steady basis is proposed, where a mobile object detection method and a device described in Patent Document 1 are used for such a system.

The mobile object detection device described in Patent Document 1 temporarily interrupts the communication and does not perform read or write of data in a non-detecting area if the antenna includes one or more detecting areas and non-detecting areas. The disconnection control of the communication is carried out so that read and write of data are performed only in the detecting area. Furthermore, when carrying out the disconnection control of the communication, whether or not the tag is detected is verified, and whether or not to perform the read or write of data is determined. In such a mobile object detection device, whether the tag is detected is determined by tag detection means and the read and write of data are performed only in the detecting area instead of the interrogating wave being transmitted on a steady basis. As a result, a read and write error of the data originating from the non-detecting area can be effectively avoided, and unnecessary radio transmission can be reduced.

Although a specific configuration of the tag detection means is not described in Patent Document 1, the tag detection means is assumed to have a configuration equivalent to a sensor, with reference to the description of the specification and the drawings thereof. However, the system that detects the mobile object using the sensor and communicates with the tag leads to enlargement of the system and also results in high cost. In addition, the occupying band of the frequency becomes wide when the transmission speed becomes high, which may become the cause of interference between channels. To prevent interference to an adjacent channel, the transmission speed is desirably maintained at low speed as much as possible under a situation where high-speed communication is not required, but a criterion for maintaining a low speed is lacking.

Patent Document 1: Japanese Unexamined Patent Publication No. 2006-99189

DISCLOSURE OF THE INVENTION

The present invention has been devised to solve the above-described problems, and an object thereof is to provide a tag communication device and a tag communication method, where communication between tags is improved by causing a mobile object with an RFID tag attached to transmit an interrogating wave only when moving in a communication range to reduce power consumption and to prevent an occurrence of tag confusion.

The present invention has been devised to solve the above-described problems, and there is provided a tag communication device for performing wireless communication with an RFID tag by transmitting an interrogating wave from an antenna to a mobile object with the RFID tag attached in a predetermined communication range, the tag communication device including: Doppler measurement means for obtaining a Doppler signal from a transmission wave and a reflected wave thereof; and communication control means for controlling the transmission of the interrogating wave so as to transmit the interrogating wave when the Doppler signal is obtained by the Doppler measurement means, and so as not to transmit the interrogating wave when the Doppler signal is not obtained by the Doppler measurement means.

The Doppler measurement means is a means for detecting a difference in frequency that occurs between a frequency of a transmission wave and a frequency of a reflected wave thereof as a Doppler signal, using a Doppler effect. For example, assume a case where the Doppler measuring means is fixed at a predetermined position, and the mobile object moves at a speed v in a direction of moving away from the Doppler measurement means. A Doppler frequency Δf, that is the Doppler signal, is expressed with the following equation 1, where $f_s$ is the frequency of the transmission wave, $f_0$ is the frequency of the reflected wave generated when the transmission wave is reflected by the mobile object and returned, and c is a speed of light ($300 \times 10^6$ m/s).

$$\Delta f = f_s - f_0 = \frac{2 \times f_s \times v}{c} \qquad \text{< Equation 1 >}$$

That is, when the mobile object is moving, the frequency $f_s$ of the issued transmission wave and the frequency $f_0$ of the received reflected wave differs by the Doppler effect. The signal corresponding to the difference (Doppler signal) Δf of the frequencies is detected by the Doppler measurement means, and whether or not the mobile object is moving is detected based on such a signal.

In the present invention, there is provided a tag communication device for performing wireless communication with an RFID tag by transmitting an interrogating wave from an antenna to a mobile object with the RFID tag attached in a predetermined communication range, the tag communication device including: Doppler measurement means for obtaining a Doppler signal for every frequency from transmission waves with a plurality of frequencies and reflected waves thereof; phase difference detection means for detecting a phase difference of the Doppler signals of two frequencies of the Doppler signals for every frequency; and communication control means for controlling the transmission of the interrogating wave so as to transmit the interrogating wave when the phase difference is detected by the phase difference detection means, and so as not to transmit the interrogating wave when the phase difference is not detected by the phase difference detection means.

In the present invention, there is also provided a tag communication device for performing wireless communication with an RFID tag by transmitting an interrogating wave from an antenna to a mobile object with the RFID tag attached in a predetermined communication range, the tag communication device including: first Doppler measurement means for obtaining a first Doppler signal from a transmission wave with a first frequency and a reflected wave thereof; second Doppler measurement means for obtaining a second Doppler signal from a transmission wave with a second frequency different from the first frequency and a reflected wave thereof; phase difference detection means for detecting a phase difference between the first Doppler signal and the second Doppler signal; and communication control means for controlling the transmission of the interrogating wave so as to transmit the interrogating wave when the phase difference is detected by the phase difference detection means, and so as not to transmit the interrogating wave when the phase difference is not detected by the phase difference detection means.

The "mobile object" includes an object that moves with a help of another force, such as a cargo or an article conveyed by the conveying means such as a belt conveyor, and in this case, the belt conveyor becomes a movement path. The "mobile object" also includes an object that moves with its own force such as humans and animals.

The "RFID tag" includes a passive type RFID tag in which a power supply such as a battery is not provided and in which a circuit operates by power transmitted by an electrical wave from a reader/writer to perform wireless communication with the reader/writer, and an active type RFID tag in which the power supply such as a battery is provided.

The "tag communication device" is, for example, a reader/writer or a reader, writer capable of communicating with the RFID tag.

In the present invention, the device that detects the movement of the article using the Doppler effect is provided. The article moves with respect to the tag communication device or the wave source. In other words, if there is a mobile object, the transmission wave with a first frequency and a transmission wave with a second frequency different therefrom are transmitted to the mobile object, so that the respective transmission waves are reflected by the mobile object and the respective reflected waves are received by the tag communication device. The first Doppler signal and the second Doppler signal are generated from the received reflected wave and the transmission wave with the first frequency and the transmission wave with the second frequency, respectively. According to the Doppler effect, the frequencies of the transmission wave transmitted from the wave source and the reflected wave reflected by the mobile object change, that is, the frequency becomes high when the wave source and the mobile object approach and the frequency becomes low when they separate, so that a phase difference is detected between the first Doppler signal and the second Doppler signal. With the detection of the phase difference, determination is made that the mobile object is detected in the present invention.

The device may further include stop tag detection means for detecting presence of reception of a response wave with respect to the interrogating wave transmitted from the antenna when the phase difference is not detected by the phase difference detection means, and detecting that a stopped RFID tag is present in the predetermined communication range when the response wave is received; and the communication control means may stop the transmission of the interrogating wave after the detection by the stop tag detection means.

If the stopped object with the RFID tag attached is present in the communication range, the tag communication device also wirelessly communicates with such an object and receives the response wave from such an object even if the mobile object is detected and the tag communication device transmits the interrogating wave to the RFID tag. For example, if one mobile object and one stopped object are present and if the RFID tag is attached to both objects, the tag communication device receives two response waves, however, it cannot be determined which response wave is from which object. Thus, stop tag detection means for checking the presence of the stopped object is provided in the present invention. Specifically, instead of immediately stopping the transmission of the interrogating wave when the mobile object cannot be found as a result of the detection of the mobile object described above, the interrogating wave is transmitted again, and the transmission of the interrogating wave is stopped if the response wave is not received. In this manner, when the response wave is received, the response wave is received even though the mobile object is not present and determination can be made that the response wave is from the stopped object.

The device may further include tagless movement detection means for detecting presence of reception of a response wave with respect to the interrogating wave transmitted from the antenna after the phase difference is detected by the phase difference detection means, and detecting that the mobile object without the RFID tag attached moved in the predetermined communication range when the response wave is not received; and the communication control means may stop the transmission of the interrogating wave after the detection by the tagless movement detection means.

Even if the RFID tag is not attached to the mobile object, the tag communication device detects the mobile object and transmits the interrogating wave when the mobile object enters the communication range, but the possibility the RFID tag is not attached to the mobile object is high if no response wave can be received with respect to the interrogating wave. The tagless mobile object detection means detects such a case, and performs the detection to detect the tagless mobile object.

The device may further include distance calculating means for calculating a distance between the mobile object and the antenna from the phase difference detected by the phase difference detection means; and transmission power adjustment means for adjusting transmission power of the interrogating wave during the wireless communication according to the distance calculated by the distance calculation means.

When the tag communication device detects the mobile object, the distance between the tag communication device and the mobile object is calculated with the following equation. That is, a distance I is obtained by the following equation with $f_{t1}$ as the first frequency of the transmission wave, $f_{t2}$ as the second frequency of the transmission wave, T as the cycle of the Doppler signal, and τ as the phase difference (time difference) of the Doppler signals. Here, c is a speed of light.

$$l = \frac{c}{2(f_{t1} - f_{t2})} \cdot \frac{\tau}{T} \qquad <\text{Equation 2}>$$

In the present invention, the distance I is calculated, where the transmission power of the interrogating wave is set high if distant, and the transmission power of the interrogating wave is set low if close, so that the transmission power can be reduced. The threshold value of the distance may be set in advance, and the high and low of the transmission power may be set depending on whether or not the calculated distance I exceeds such a threshold value.

The device may further include communication abnormality detection means for determining as a communication abnormality when the phase difference is detected by the phase difference detection means and the response wave is not received from the RFID tag.

If the phase difference is detected, this means that the mobile object has entered the communication range, and thus the response wave with respect to the transmitted interrogating wave should be received if the RFID tag is attached to the mobile object. Thus, if the phase difference is detected and the response wave is not received, determination is made as a communication abnormality and notification is made to the external device and the like.

The antenna may be a scan antenna, including a plurality of antenna elements, for scanning a beam of the transmission wave; and the device may include: scan antenna control means for controlling an orientation of the transmission wave based on a scan angle of the scan antenna; the communication control means acquires the scan angle of the scan antenna upon detection when the phase difference detection means detects the phase difference, and sets a directional angle of the interrogating wave according to the scan angle and transmits the interrogating wave; and the device may further include movement direction detection means for detecting a movement direction of the mobile object based on a transition of the directional angle.

The "scan antenna" includes a phased array antenna capable of scanning at high speed the beam of the electrical wave transmitted by electronic control, and is configured by a plurality of antenna elements, a plurality of phase shifters connected to each of the plurality of antenna elements, and one distribution synthesizer connected to all of the plurality of phase shifters. The electrical wave inputted to the distribution synthesizer is distributed to the phase shifter of every antenna element, subjected to the desired phase change at each phase shifter, and then radiated from each antenna element, and the electrical wave is radiated strongly in a direction in which each electrical wave after such a phase change are all in phase, that is, a direction in which the phase of the sine wave coincides. The strongest electrical wave is a main lobe, and the direction can be arbitrarily changed by the setting of the phase shifter.

The plurality of antenna elements may be configured by a patch antenna, and furthermore, the plurality of antenna elements is two-dimensionally arrayed, so that the scan antenna can perform two-dimensionally scanning with respect to the movement path of the mobile object. The plurality of antennas is suitably configured by the patch antenna, so that the scan antenna can be manufactured thin and the manufacturing cost can be suppressed low.

The communication control means may transition a directional angle of the interrogating wave according to a movement direction detected by the movement direction detection means.

In the present invention, there is provided a tag communication method for performing wireless communication with an RFID tag by transmitting an interrogating wave from an antenna to a mobile object with the RFID tag attached in a predetermined communication range, the tag communication method including the steps of: a Doppler measurement step for obtaining a Doppler signal from a transmission wave and a reflected wave thereof; and a communication control step for controlling the transmission of the interrogating wave so as to transmit the interrogating wave when the Doppler signal is obtained by the Doppler measurement step, and so as not to transmit the interrogating wave when the Doppler signal is not obtained by the Doppler measurement step.

In the present invention, there is also provided a tag communication method for performing wireless communication with an RFID tag by transmitting an interrogating wave from an antenna to a mobile object with the RFID tag attached in a predetermined communication range, the tag communication method including the steps of: a Doppler measurement step for obtaining a Doppler signal for every frequency from transmission waves with a plurality of frequencies and reflected waves thereof; a phase difference detection step for detecting a phase difference of the Doppler signals of two frequencies of the Doppler signals for every frequency; and communication control step for controlling the transmission of the interrogating wave so as to transmit the interrogating wave when the phase difference is detected by the phase difference detection step, and so as not to transmit the interrogating wave when the phase difference is not detected by the phase difference detection step.

In the present invention, there is also provided a tag communication method for performing wireless communication with an RFID tag by transmitting an interrogating wave from an antenna to a mobile object with the RFID tag attached in a predetermined communication range, the tag communication method including the steps of: a first Doppler measurement step for obtaining a first Doppler signal from a transmission wave with a first frequency and a reflected wave thereof; a second Doppler measurement step for obtaining a second Doppler signal from a transmission wave with a second frequency different from the first frequency and a reflected wave thereof; a phase difference detection step for detecting a phase difference between the first Doppler signal and the second Doppler signal; and a communication control step for controlling the transmission of the interrogating wave so as to transmit the interrogating wave when the phase difference is detected by the phase difference detection step, and so as not to transmit the interrogating wave when the phase difference is not detected by the phase difference detection step.

The method may further include the step of: a stop tag detection step for detecting presence of reception of a response wave with respect to the interrogating wave transmitted from the antenna when the phase difference is not detected by the phase difference detection step, and detecting that a stopped RFID tag is present in the predetermined communication range when the response wave is received; and the communication control step may stop the transmission of the interrogating wave after the detection by the stop tag detection means.

The method may further include the step of: a tagless movement detection step for detecting presence of reception of a response wave with respect to the interrogating wave transmitted from the antenna after the phase difference is detected by the phase difference detection step, and detecting that the mobile object without the RFID tag attached moved in the predetermined communication range when the response wave is not received; and the communication control step may stop the transmission of the interrogating wave after the detection by the tagless movement detection step.

The method may further include the steps of: a distance calculating step for calculating a distance between the mobile object and the antenna from the phase difference detected by the phase difference detection step; and a transmission power adjustment step for adjusting transmission power of the interrogating wave during the wireless communication according to the distance calculated by the distance calculation step.

The method may further include the step of: a communication abnormality detection step for determining as a communication abnormality when the phase difference is detected by the phase difference detection step and the response wave is not received from the RFID tag.

The antenna may be a scan antenna capable of scanning the beam of the transmission wave toward space on the movement path of the mobile object, where a scan antenna control step of controlling the scan and detecting the scan angle of the scan antenna when the phase difference is detected by the phase difference detection step, and a movement direction detection step of calculating the movement direction of the mobile object from the scan angle are provided, so that the scan antenna can be scanned along the movement direction calculated by the movement direction detection step.

The antenna may be a scan antenna, including a plurality of antenna elements, for scanning a beam of the transmission wave; and the method may include a scan antenna control step for controlling an orientation of the transmission wave based on a scan angle of the scan antenna; the communication control step may acquire the scan angle of the scan antenna upon detection when the phase difference is detected in the phase difference detection step, and set a directional angle of the interrogating wave according to the scan angle and transmits the interrogating wave; and the method may further include detecting a movement direction of the mobile object based on a transition of the directional angle.

The communication control step may transition a directional angle of the interrogating wave according to a movement direction detected by the movement direction detection.

EFFECTS OF THE INVENTION

As described above, according to the present invention, a mobile object is detected using Doppler measurement, and an interrogating wave is transmitted only when the mobile object is detected. Thus, power consumption is reduced, an occurrence of tag confusion is prevented, and communication between tags is improved.

BRIEF DESCRIPTION OF THE DRAWINGS

FIG. 2(a) shows a state where a cargo to be conveyed is in a communication range, and FIG. 2(b) shows a state where the cargo is outside the communication range.

FIG. 3(a) shows a state where the cargo to be conveyed is in the communication range and communication is made with both the tag attached to the cargo and the stop tag, and FIG. 3(b) shows a state where the cargo is outside the communication range and the stop tag is detected.

FIG. 6(a) shows a state where the cargo with the tag attached is in the communication range and communication is made with the attached tag and the stopped tag, and FIG. 6(b) shows a state where the tagless cargo is in the communication range and communication is made with the stopped tag.

FIG. 7(a) shows a state where the cargo with the tag attached is in the communication range and communication is made only with the attached tag, and FIG. 7(b) shows a state where the tagless cargo is in the communication range and communication is not made.

FIG. 14(a) shows a state where the cargo is moving closer to the communication range, FIG. 14(b) shows a state where the cargo is positioned substantially at a front of the reader/writer, and FIG. 14(c) shows a state where the cargo is moving away from the communication range.

DESCRIPTION OF SYMBOLS 1A, 1B Reader writer (tag communication device)
2A, 2B RFID tag
3A, 3B Doppler module
5A Antenna
5B Scan antenna
7 Signal processing part
8 Tag communication part 9 Transmitting/receiving part
10 Scan antenna control part
21A, 21B Cargo
RW Interrogating wave
CW Transmission wave
A Communication range

BEST MODE FOR CARRYING OUT THE INVENTION

The best modes for carrying out the present invention will be described below in detail with reference to the accompanied drawings. The description will be made below with a tag communication device of the present invention as a reader/writer, and a mobile object as a cargo to be moved by conveying means such as a belt conveyor, but the present invention is not limited thereto. Doppler measurement means using two-frequencies is used herein, but the present invention is not limited thereto. For example, two frequencies do not necessarily need to be used if merely detecting the mobile object, and only one frequency may be used. A configuration of selectively obtaining the Doppler signal using a transmission wave with plural frequencies of more than two frequencies may be adopted.

Figure 1:
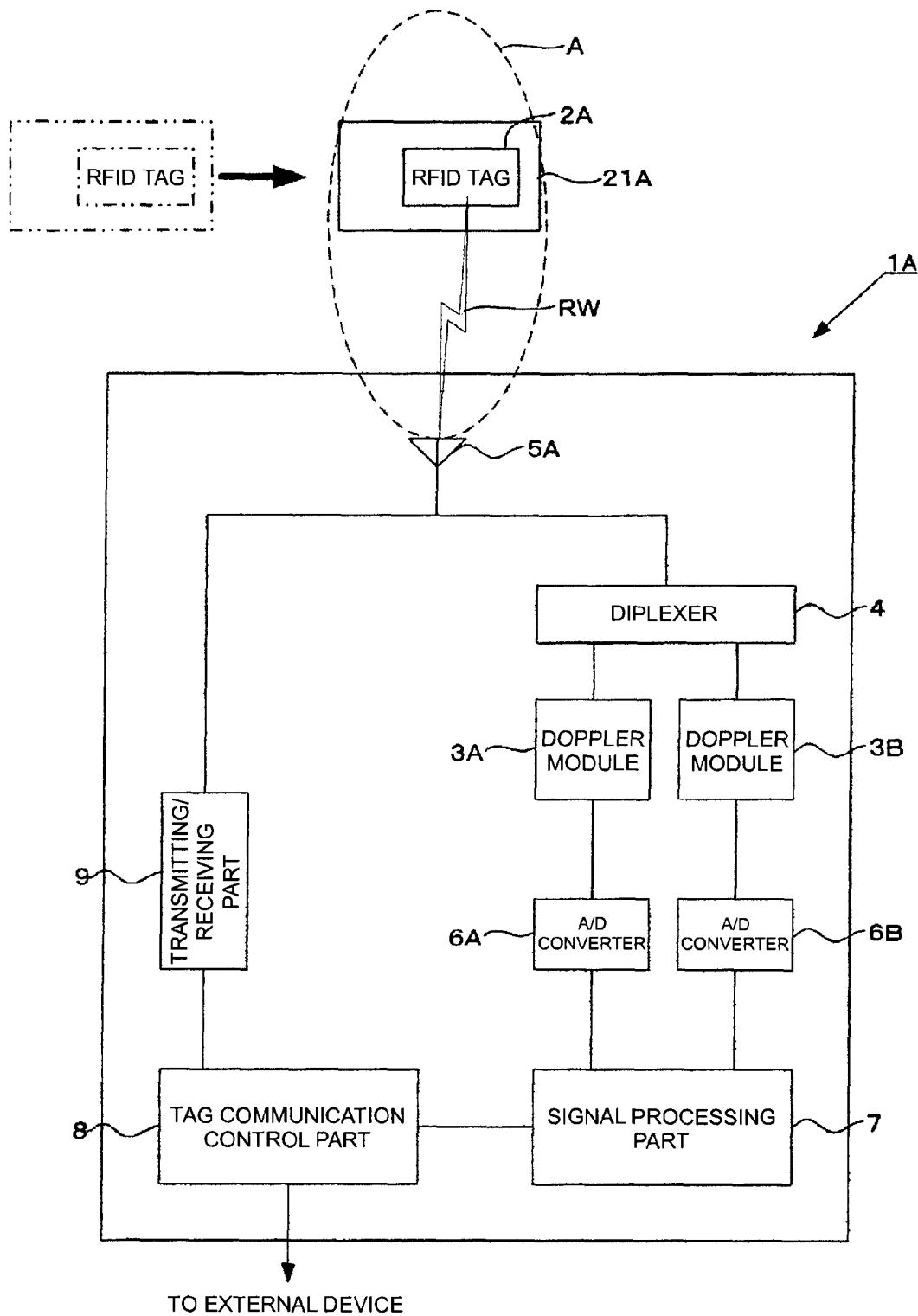
FIG. 1 is a block diagram showing a schematic configuration of a reader/writer according to an embodiment of the present invention.
Figure 2:
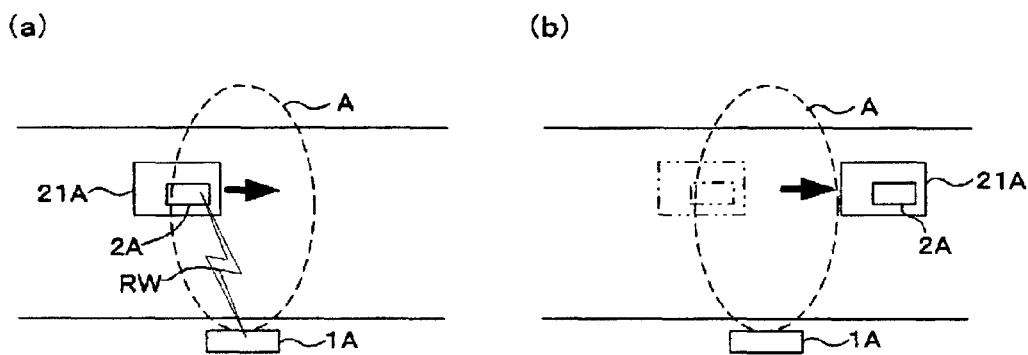
FIGS. 2(a) and 2(b) are schematic views each describing a state the reader/writer transmits an interrogating wave, where
Figure 3:
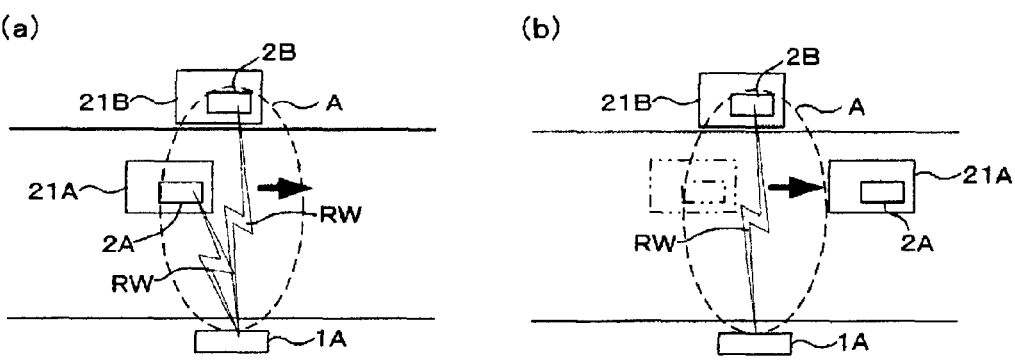
FIGS. 3(a) and 3(b) are schematic views each describing a state of determining a stop tag in the reader/writer when a stopped cargo with the tag attached is present in the communication range, where
Figure 4:
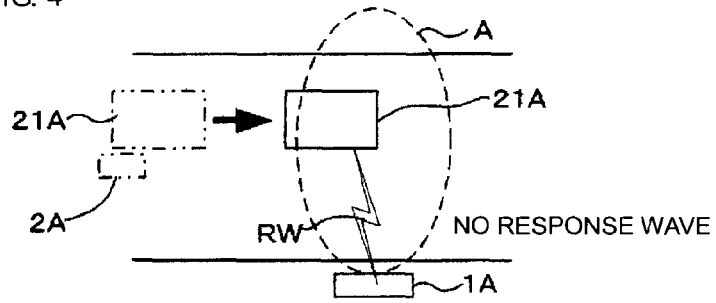
FIG. 4 is a schematic view describing a state where the reader/writer detects the movement of a tagless cargo when a cargo without the tag attached enters the communication range.
Figure 5:
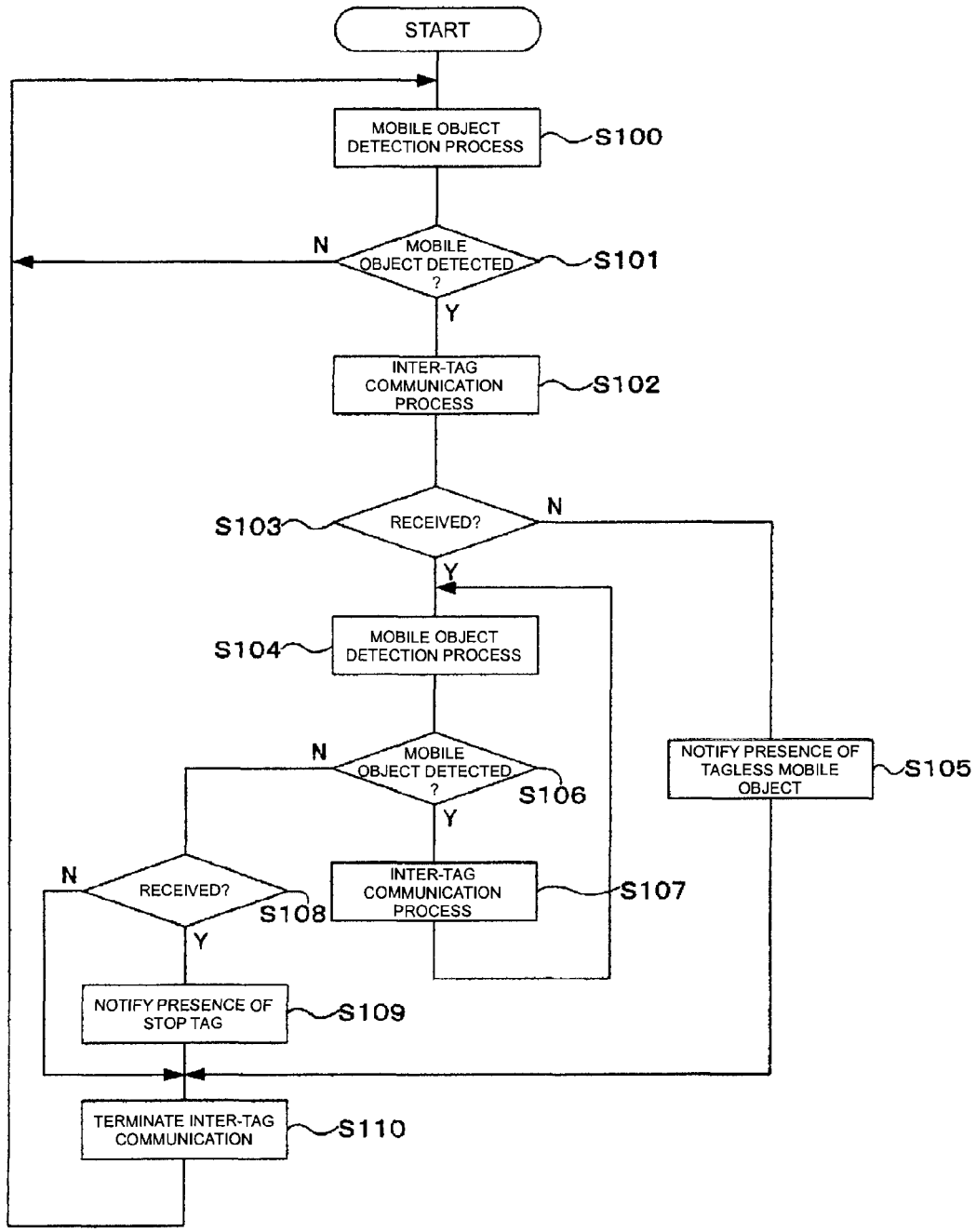
FIG. 5 is a flowchart showing a mobile object detection process and an inter-tag communication process in the reader/writer.
Figure 6:
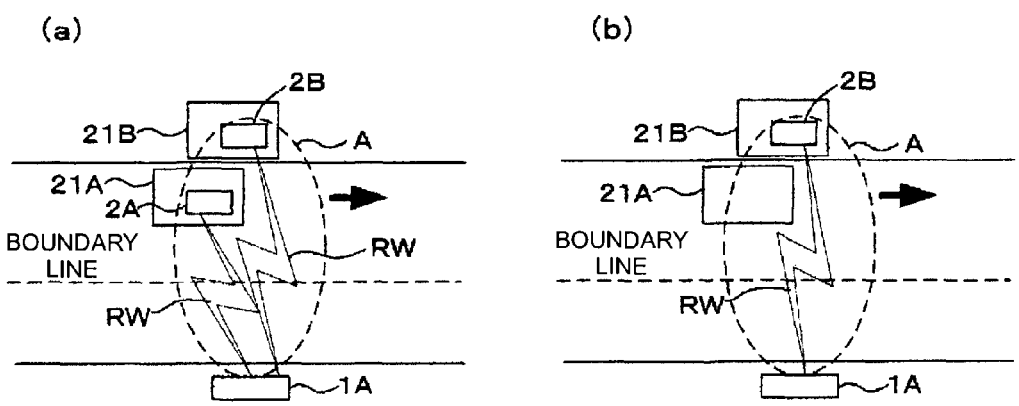
FIGS. 6(a) and 6(b) are schematic views each showing a state where the reader/writer transmits the interrogating wave with transmission power set high according to a distance with the tag, where
Figure 7:
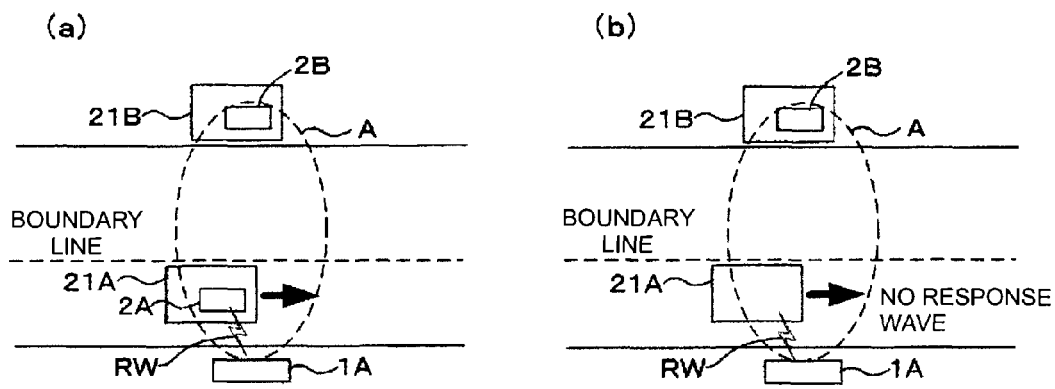
FIGS. 7(a) and 7(b) are schematic views each showing a state where the reader/writer transmits the interrogating wave with the transmission power set low according to the distance with the tag, where

FIG. 1 is a block diagram showing a schematic configuration of a reader/writer according to an embodiment of the present invention, FIGS. 2(a) and 2(b) to FIG. 4 are schematic views each describing a state where the reader/writer shown in FIG. 1 transmits the interrogating wave, and FIG. 5 is a flowchart for describing an operation of the reader/writer shown in FIG. 1.

As shown in FIG. 1, the reader/writer 1A according to the present embodiment includes Doppler modules 3A, 3B, a diplexer 4, an antenna 5A, A/D converters 6A, 6B, a signal processing part 7, a tag communication control part 8, and a transmitting/receiving part 9.

The Doppler module 3A is first Doppler measurement means for obtaining a first Doppler signal from a transmission wave with a first frequency $f_{r1}$ and a reflected wave thereof. The Doppler module 3A generates the transmission wave including a continuous wave such as a sine wave. The transmission wave is radiated from the antenna 5A, which is used for transmission and reception, through the diplexer 4. The reflected wave reflected at a cargo 21A, which is a reflection target object, is received by the antenna 5A, and inputted to the Doppler module 3A through the diplexer 4. The Doppler module 3A generates the first Doppler signal corresponding to a difference between the frequency of the transmission wave and the frequency of the reflected wave (reception wave). The Doppler signal is amplified, and then inputted to the signal processing part 7 through the A/D converter 6A.

The Doppler module 3B is second Doppler measurement means for obtaining a second Doppler signal from a transmission wave with a second frequency $f_{r2}$ and a reflected wave thereof. Other than that the first frequency $f_{r1}$ and the second frequency $f_{r2}$ are different, the configurations of the Doppler modules 3A, 3B are the same. In the present embodiment, the difference between the frequencies $f_{r1}$ and $f_{r2}$ is set to a few dozen MHz using the microwave of 10 GHz. The two frequencies do not need to be completely fixed, and may be arbitrarily changed by a user.

The diplexer 4 is a frequency separator for preventing the transmission wave/reception wave with different frequencies from leaking into the respective Doppler modules 3A, 3B. The two Doppler modules 3A, 3B thus commonly use one antenna 5A.

If the difference between the frequencies $f_{r1}$ and $f_{r2}$ is sufficiently large compared to the frequency of the Doppler signal, the diplexer 4 may be omitted in this case since the Doppler signal is not greatly influenced even if the signal of one module leaks into the other module.

The signal processing part 7 is a circuit for performing digital signal processing according to a program, and mainly functions as phase difference detection means for detecting a phase difference from two-frequency Doppler signals inputted from the Doppler modules 3A, 3B. By causing the signal processing part 7 to function as the phase difference detection means, the reader/writer 1A can transmit an interrogating wave RW only when the cargo 21A with an RFID tag 2A attached moves in a communication range A. In other words, a mobile object detection process of detecting whether or not a phase difference exists between the first Doppler signal and the second Doppler signal inputted to the signal processing part 7 through the A/D converters 6A, 6B, respectively, from the Doppler modules 3A, 3B is performed, and determination is made that the cargo 21A has moved if the phase difference exists.

Specifically, the mobile object detection process detects the movement of the cargo 21A using a Doppler effect described below. Since the cargo 21A moves with respect to the reader/writer 1A, which is the wave source, the signal processing part 7 calculates the phase difference using the Doppler effect in which the frequency of the reflected wave reflected at the cargo 21A changes when a transmission wave CW is transmitted to the cargo 21A, and transmits a signal notifying that the cargo 21A is moving to the communication control part 8 if the phase difference is detected. The signal processing part 7 may also function as stop tag detection means, tagless movement detection means, and distance calculation means, as described below.

The tag communication control part 8 is mainly a circuit that functions as communication control means for performing control of the communication between the RFID tag 2A attached to the cargo 21A conveyed by the conveying means such as the belt conveyor and the reader/writer 1A. As described below, the tag communication control part 8 may also function as transmission power adjustment means and communication abnormality detection means.

The transmitting/receiving part 9 converts transmission command information transmitted from the tag communication control part 8 to a format suited for wireless transmission and transmits the converted wireless signal to the RFID tag 2A through the antenna 5A as the interrogating wave RW, and performs processes such as modulation and amplification of the transmission command information. The transmitting/receiving part 9 also converts the response wave received through the antenna 5A from the RFID tag 21A to the original format and transmits the converted data to the tag communication control part 8, and performs processes such as amplification and demodulation of the reception data.

The antenna 5A is configured to transmit the transmission wave CW generated by the Doppler modules 3A, 3B and the interrogating wave RW to transmit to the RFID tag 21, and to receive the reflected wave with respect to the transmission wave CW and the response wave with respect to the interrogating wave RW. The transmission wave CW is not illustrated as it may complicate the drawing, and the interrogating wave RW is illustrated only when necessary. This is the same in the subsequent description.

With respect to the reader/writer 1A configured as above, the description on the respective operation will be described with reference to FIGS. 2(a) and 2(b) to FIG. 5 for a first embodiment, with reference to FIGS. 6(a) and 6(b) to FIG. 8 for a second embodiment, and with reference to FIG. 9 for a third embodiment. The moving cargo is hereinafter simply referred to as "cargo 21A", and the stopped cargo is simply referred to as "cargo 21B".

First Embodiment

In a reader/writer 1A according to the first embodiment, the stop tag detection process and the tagless movement detection process are also performed, other than performing the process (hereinafter referred to as "basic process of the present invention") in which the reader/writer 1A transmits the interrogating wave RW only when the RFID tag 2A is detected by the tag movement detection process, as described below.

FIGS. 2(a) and 2(b) are schematic views describing a basic process of the present invention, FIGS. 3(a) and 3(b) are schematic views describing the stop tag detection process, FIG. 4 is a schematic view describing the tagless movement detection process, and FIG. 5 is a flowchart showing the basic process, the stop tag detection process and the tagless movement detection process.

As shown in FIG. 5, when the reader/writer 1A is activated, the mobile object detection process is first performed (S100). The mobile object detection process is as described above, and is performed by transmitting the transmission wave with the first frequency $f_{t1}$ from the Doppler module 3A and the transmission wave with the second frequency $f_{t2}$ from the Doppler module 3B, generating the first Doppler signal and the second Doppler signal from the reflected waves thereof, and calculating whether or not the phase difference of the Doppler signals is detected. The description will be made by indicating the two transmission waves collectively as a transmission wave CW (Continuous wave).

The mobile object detection process is repeatedly performed until the cargo 21A is detected (N in S101), and with the detection of the cargo 21A (Y in S101) as a trigger, the inter-tag communication process is then performed, that is the reader/writer 1A transmits the interrogating wave RW (S102). If the RFID tag 2A is attached to the cargo 21A that entered the communication range A, the reader/writer 1A receives the response wave with respect to the interrogating wave RW from the RFID tag 2A through the antenna 5A. If the RFID tag 2A is not attached to the cargo 21A from the beginning or if the RFID tag 2A is stripped off while being conveyed, the response wave is not returned even if the interrogating wave RW is transmitted to the cargo 21A.

The reader/writer 1A checks whether or not the response wave is received from the cargo 21A after transmitting the interrogating wave RW (S103), and as a result, determines that the RFID tag 2A is not attached to the cargo 21A in the signal processing part 7 if the response wave is not received (N in S103). A signal detecting the movement of the tagless cargo is then transmitted to an external device through the tag communication control part 8 (S105). The state where the movement of the tagless cargo is detected is shown in FIG. 4, where the response is not returned even if the reader/writer 1A detects the cargo 21A and transmits the interrogating wave RW since the RFID tag 2A is not attached to the cargo 21A.

If the response wave is received from the cargo 21A after the reader/writer 1A transmits the interrogating wave RW (Y in S103), the reader/writer 1A further performs the mobile object detection process (S104), and as a result, continues the inter-tag communication process (S107) if the cargo 21A is detected (Y in S106). As shown in FIGS. 2(a) and 2(b), the cargo 21A moves in the communication range A of the reader/writer 1A after once being detected by the mobile object detection process, and thus the processes of S104, S106, and S107 are repeatedly performed until the cargo 21A moves out of the communication range A, as shown in FIG. 2(b). When the cargo 21A moves out of the communication range A, the cargo 21A as the mobile object is not detected as a result of the mobile object detection process (N in S106).

Therefore, the reader/writer 1A is prevented from transmitting wasteful interrogating wave RW, power consumption can be reduced and tag confusion can be prevented by causing the reader/writer 1A to immediately stop the transmission of the interrogating wave RW with the cargo 21A outside the communication range A.

In the reader/writer 1A according to the first embodiment, the presence of the stop tag in the communication range A is checked, as described below, where notification is made to the external device if the stop tag is present, and the communication between tags is terminated if the stop tag is not present. Specifically describing, as shown in FIG. 3(a), if the cargo 21B that dropped from the belt conveyor is present in the communication range A, the reader/writer 1A not only transmits the interrogating wave RW to the RFID tag 2A of the cargo 21A when the cargo 21A enters the communication range A, but also transmits the interrogating wave RW to the RFID tag 2B of the cargo 21B. In this case, the reader/writer 1A receives two response waves, but it cannot be determined which response wave is from the cargo 2A if the reader/writer 1A receives two response waves.

However, since the mobile object detection is not made at the time the cargo 21A moved out from the communication range A, when the reader/writer 1A transmits the interrogating wave RW at this point of time and receives the response wave with respect to such an interrogating wave RW, such a response wave can be determined as being from the RFID tag 2B of the cargo 21B as shown in FIG. 3(b).

Specifically, after the process of N in S106, the reader/writer 1A again transmits the interrogating wave RW, and checks whether or not the response wave with respect to the interrogating wave RW is received (S108). If received (Y in S108), such a response wave is from the cargo 21B, and thus transmits a signal notifying that the stop tag is present in the communication range A to the external device through the tag communication control part 8 and notifies the presence of the stop tag (S109). If the response wave is not received (N in S108), the stop tag is not present, and thus the transmission of the interrogating wave RW is stopped and the inter-tag communication is terminated (S110).

As described above, in the reader/writer 1A according to the first embodiment, the basic process of the present invention to transmit the interrogating wave RW is performed only when the moving cargo 21A is in the communication range A, so that the power consumption can be reduced, the occurrence of tag confusion can be prevented, and the communication between tags can be improved (this effect is hereinafter referred to as "basic effects of the present invention"). If the stopped cargo 21B is present in the communication range A, the presence of such a cargo 21B can be detected, and thus loss of cargo can be prevented, which is convenient in cargo management. In addition, if the cargo 21A without the RFID tag 2A attached moves in the communication range A, the movement of tagless cargo can be detected, and thus the loss of cargo can be further prevented, which is convenient in cargo management.

Second Embodiment

In a reader/writer 1A according to the second embodiment, in addition to the basic process described above, a transmission power adjustment process for setting the transmission power high or low according to the distance with the RFID tag 2A when transmitting the interrogating wave RW is performed.

Figure 8:
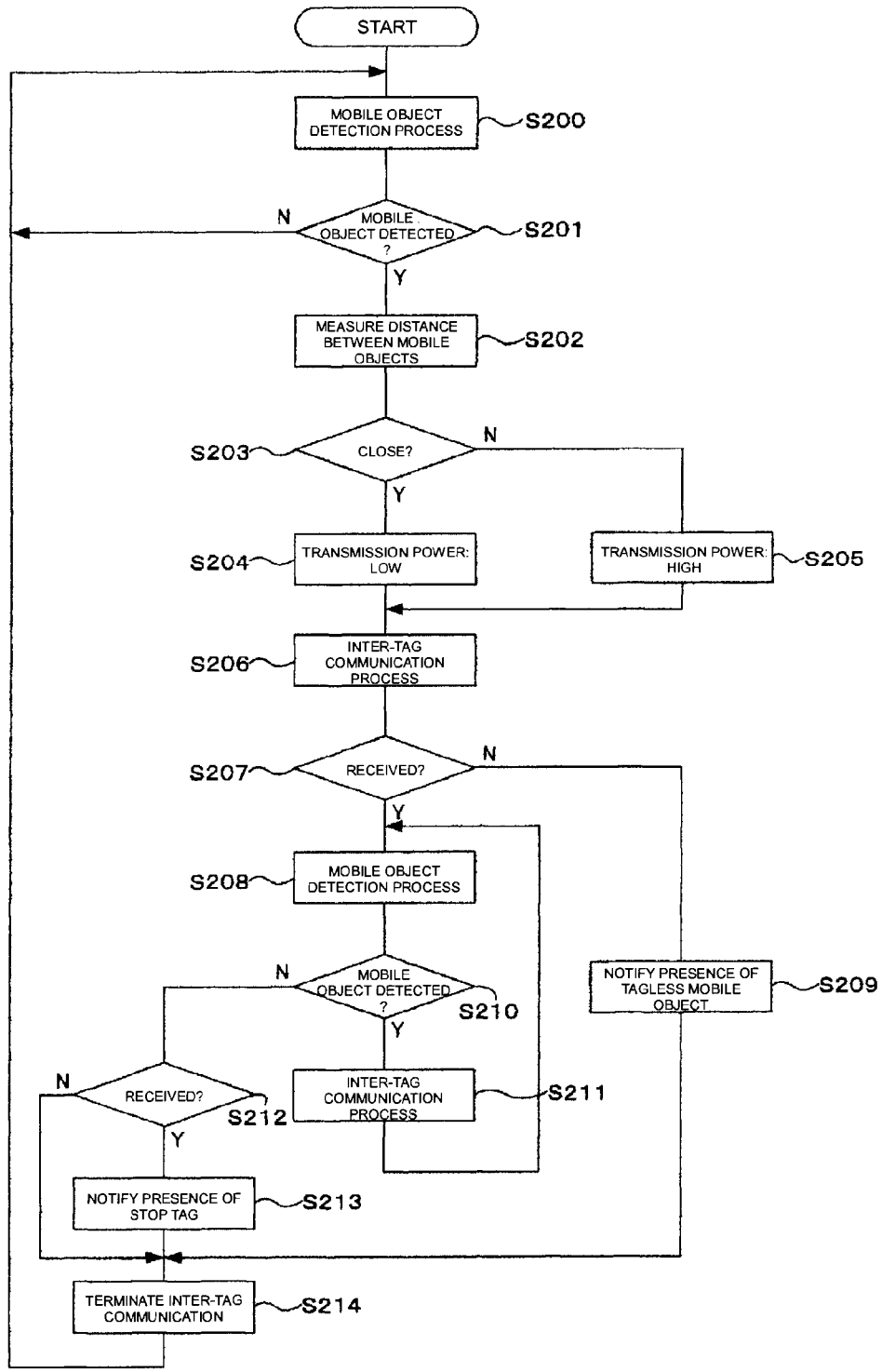
FIG. 8 is a flowchart showing an operation of the reader/writer adjusting the transmission power of the interrogating wave according to the distance with the tag.

FIGS. 6(a) and 6(b), and FIGS. 7(a) and 7(b) are schematic views describing the transmission power adjustment process, and FIG. 8 is a flowchart showing the transmission power adjustment process.

As shown in FIG. 8, when the reader/writer 1A is activated, the mobile object detection process is performed until the cargo 21A is detected (S200, S201). This process is a process similar to S100, S101, and thus the description thereof will not be given. If the cargo 21A is detected (Y in S201) as a result of the mobile object detection process, the distance between the reader/writer 1A and the cargo 21A is measured (S202). Assuming the transmission wave with the first frequency $f_{t1}$ and the transmission wave with the second frequency $f_{t2}$, a distance I is obtained from <Equation 3> where T is the cycle of the Doppler signal and τ is the phase difference (time difference) of both Doppler signals. Here, c is a speed of light.

$$l = \frac{c}{2(f_{t1} - f_{t2})} \cdot \frac{\tau}{T} \qquad < \text{Equation 3} >$$

As a result of the measurement, whether or not the distance between the reader/writer 1A and the cargo 21A is close is checked (S203). Whether or not the distance is close can be determined by having the user set a threshold value in advance, and determining as close if within the threshold value and as not close if exceeding the threshold value. The threshold value is schematically shown with a boundary line shown with a dotted line in FIGS. 6(a) and 6(b), and FIGS. 7(a) and 7(b), where the distance is close if not exceeding the boundary line (see FIGS. 7(a) and 7(b)), and not close if exceeding the boundary line (see FIGS. 6(a) and 6(b)). As a result of the measurement, the transmission power is set low (S204) if the distance is close (Y in S203), and the transmission power is set high (S205) if the distance is not close (N in S203). The transmission power is set in advance to an extent the interrogating wave RW can reach the cargo 21A in correspondence to the distance between the cargo 21A and the reader/writer 1A.

Although two classifications of high and low are provided for the transmission power in the present embodiment, but three or more classifications can be provided by finely dividing the threshold value, for example, the transmission power can be classified into three classifications of low, middle, and high. The subsequent processes are similar to the processes of S102 to S110 described above, and thus the description thereof will not be given.

In the present embodiment, however, a portion that differs from above exists if the cargo 21B is in the communication range A, which will be described with reference to FIGS. 6(a) and 6(b), and FIGS. 7(a) and 7(b). First, FIGS. 6(a) and 6(b) show a case where the transmission power is set high, where FIG. 6(a) shows a case where the RFID tag 2A is attached to the cargo 21A and FIG. 6(b) shows a case where the RFID 2A is not attached to the cargo 21A. The case of FIG. 6(a) is similar to the case of FIG. 3(a). In the case of FIG. 6(b), on the other hand, the reader/writer 1A communicates with the RFID tag 2B of the cargo 21B at the time the cargo 21A enters the communication range A, and detects the presence of the cargo 21B at the time the cargo 21A moves out of the communication range A. The details are similar to those described in the first embodiment, and thus the description thereof will not be given.

FIGS. 7(a) and 7(b) show a case where the transmission power is set low, where FIG. 7(a) shows a case where the RFID tag 2A is attached to the cargo 21A, and FIG. 7(b) shows a case where the RFID tag 2A is not attached to the cargo 21A. In the case of FIG. 7(a), the reader/writer 1A does not communicate with the RFID tag 2B of the cargo 21B since the interrogating wave RW does not reach the cargo 21B even if the cargo 21B is in the communication range A, as opposed to FIG. 6(a). In the case of FIG. 7(b) as well, the interrogating wave RW does not reach the cargo 21B, and thus the reader/writer 1A notifies the external device that a tagless cargo moved without communicating with either one.

As described above, in the reader/writer 1A according to the second embodiment, the transmission power of the interrogating wave RW can be set low or set high according to the distance between the reader/writer 1A and the RFID tag 2A, in addition to the basic effects of the present invention. The transmission power of the interrogating wave RW thus can be reduced, or communication may not be performed with the RFID tag 2B attached to the cargo 21B when such a stopped cargo 21B is present in the communication range A.

Third Embodiment

In a reader/writer 1A according to the third embodiment, a communication missing detection process, that is, a process of detecting a state where communication failure occurred between the reader/writer 1A and the RFID tag 2A attached to the cargo 21A, and notifying a communication error to the external device and the like is performed in addition to the basic process of the present invention described above. FIG. 9 is a flowchart showing the communication missing detection process.

Figure 9:
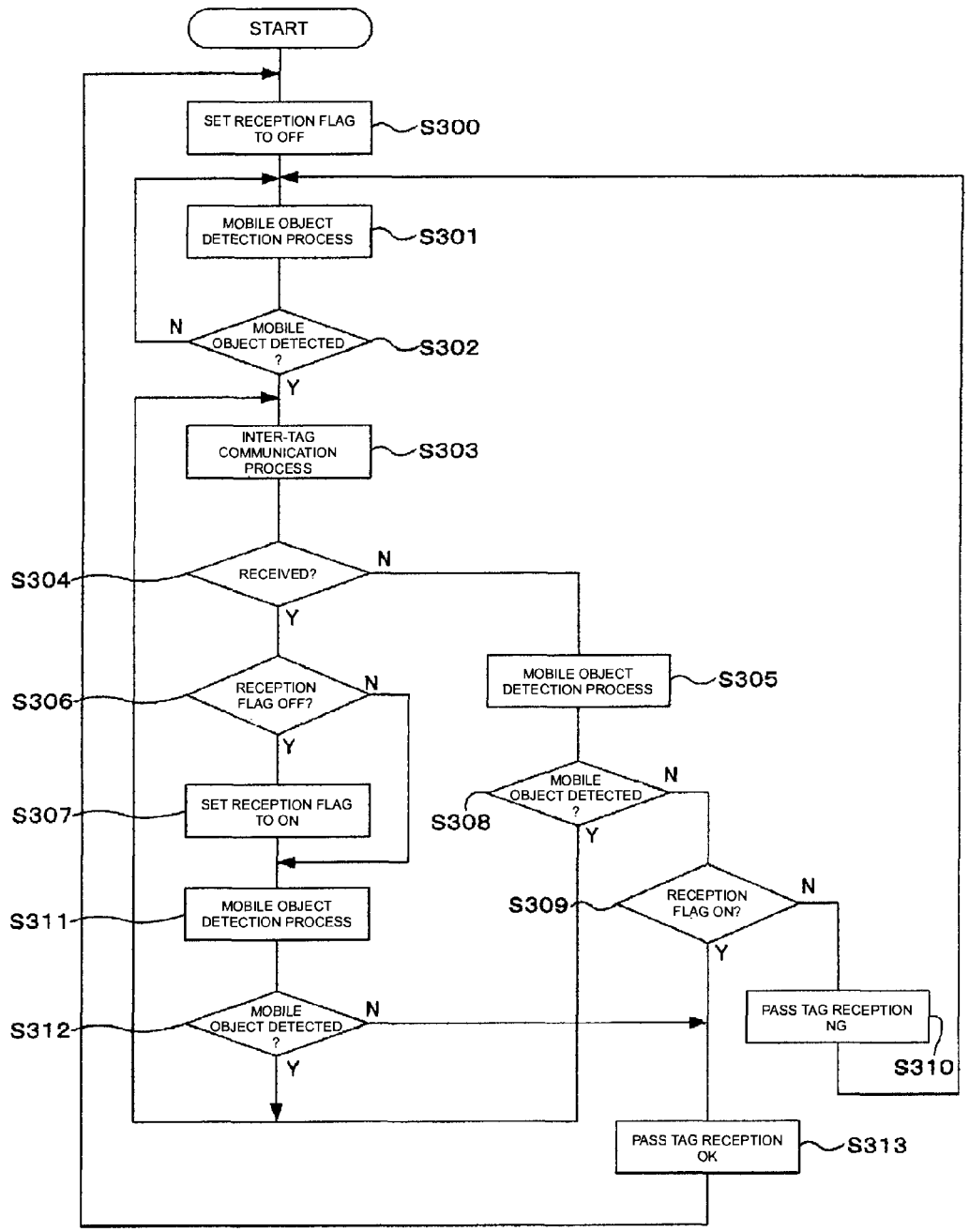
FIG. 9 is a flowchart showing a communication missing detection process in the reader/writer.

As shown in FIG. 9, when the reader/writer 1A is activated, a reception flag is first set to OFF (S300), and thereafter, the mobile object detection process (S301, S302) is performed until the cargo 21A is detected. This process is the process similar to S100, S101, and thus the description thereof will not be given. If the cargo 21A is detected (Y in S302) as a result of the mobile object detection process, the inter-tag communication process is performed (S303), and whether or not the response wave is received is checked (S304). If the response wave is received (Y in S304), whether or not the reception flag is set to OFF is checked (S304), and the reception flag is set to ON (S307) if the reception flag is set to OFF (Y in S306). The reception flag is information indicating that reception is made when the response wave is received from the RFID tag 2A of the cargo 21A, where the reception flag set to OFF indicates that the response wave is not yet received, and the reception flag set to ON indicates that the response wave is already received.

Furthermore, the mobile object detection process is performed (S311), and whether or not the cargo 21A is detected is checked (S312), where if the cargo 21A is detected (Y in S312), the process returns to the inter-tag communication process (S303), and whether or not the response wave is received is again checked (S304). The process of when reception is made is similar to the process described above. If the cargo 21A is not detected (N in S312) in the process of checking the presence of the mobile object of S312, this means that the response wave is received from the cargo 21A that moved through the communication range A and that the cargo 21A has moved out from the communication range A, and thus the inter-tag communication process is terminated, and a pass tag reception OK is notified to the external device through the tag communication control part 8 (S313). The process then returns to the process of S301 described above.

If the response wave is not received in the process of S304, the mobile object detection process is performed (S305), the presence of the mobile object detection is checked (S308), and the process returns to the process of S303 if the movement of the cargo 21A is detected (Y in S308). If the movement of the cargo 21A is not detected (N in S308), whether the reception flag is set to ON is checked (S309), where the inter-tag communication is determined to have been normally performed if set to ON (Y in S309), and the inter-tag communication process is terminated, and the pass tag reception OK is notified to the external device through the tag communication control part 8 (S313). The process then returns to the process of S300 described above. If the reception flag is not set to ON (N in S309), the inter-tag communication process is determined to have not been normally performed, and the inter-tag communication process is terminated, and the pass tag reception NG, that is, the communication error is notified to the external device through the tag communication control part 8 (S310). The process then returns to the process of S300 described above.

As described above, in the reader/writer 1A according to the third embodiment, the communication error between the reader/writer 1A and the RFID tag 2A is detected and the communication error is notified to the external device and the like, in addition to the basic effects of the present invention. In this manner, the status in which the communication error occurred can be grasped at the external device, so that the conveying means such as the belt conveyor can be stopped and re-passing can be urged, as necessary, thereby preventing disadvantages in managing entry/exit of cargos.

Fourth Embodiment

A reader/writer 1B according to the fourth embodiment differs from the reader/writer 1A in that the tag communication control part 8 functions as movement direction detection means, a scan antenna control part 10 is added, and the antenna is a scan antenna 5B. In operation, the movement direction detection process is performed in addition to the basic process of the present invention similar to the reader/writer 1A. Only the difference with the reader/writer 1A will be described in detail with reference to FIG. 10 to FIGS. 14(*a*) to 14(*c*), and the description on similar portions will not be shown.

Figure 10:
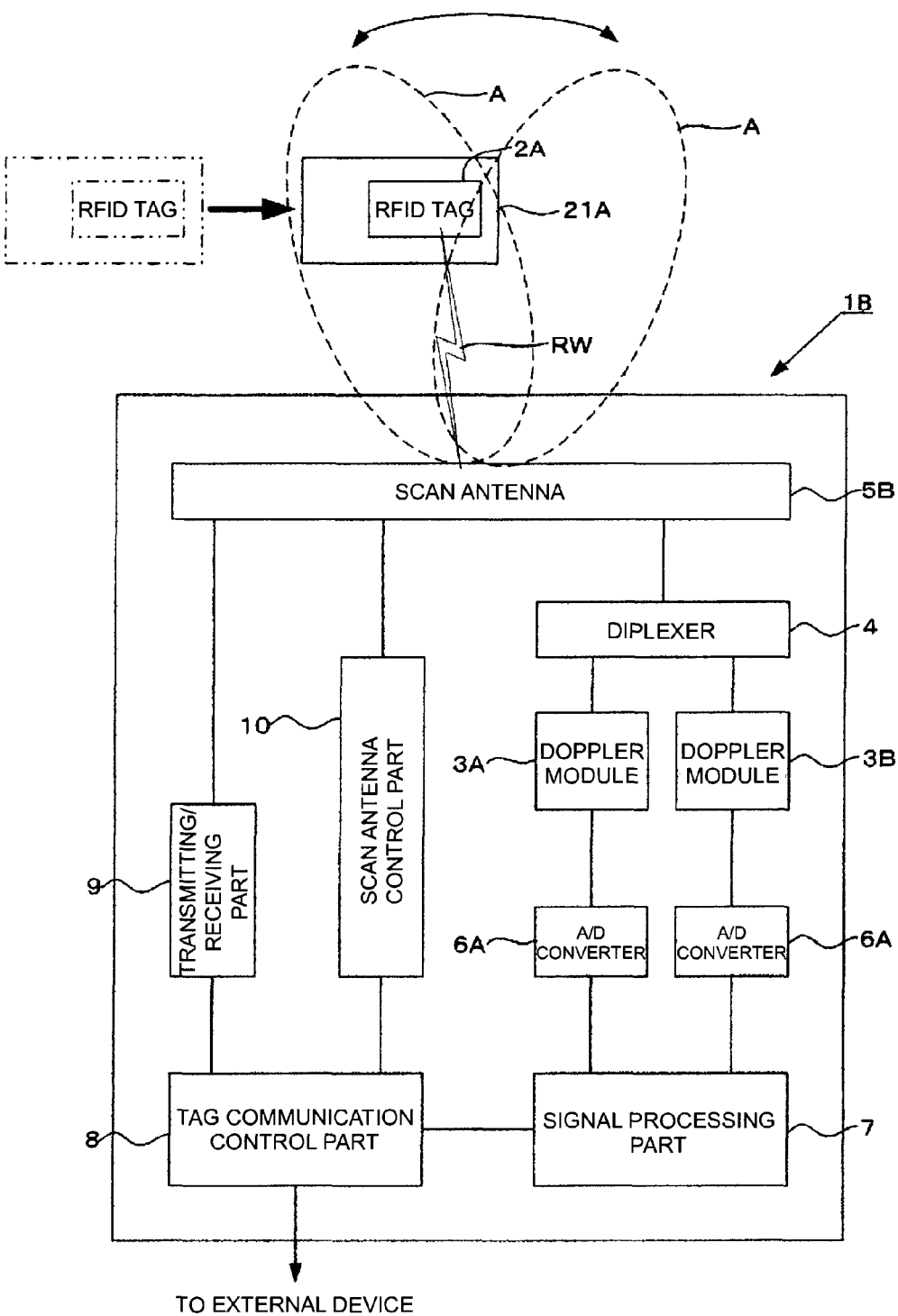
FIG. 10 is a block diagram showing a schematic configuration of a reader/writer according to another embodiment of the present invention.
Figure 11:
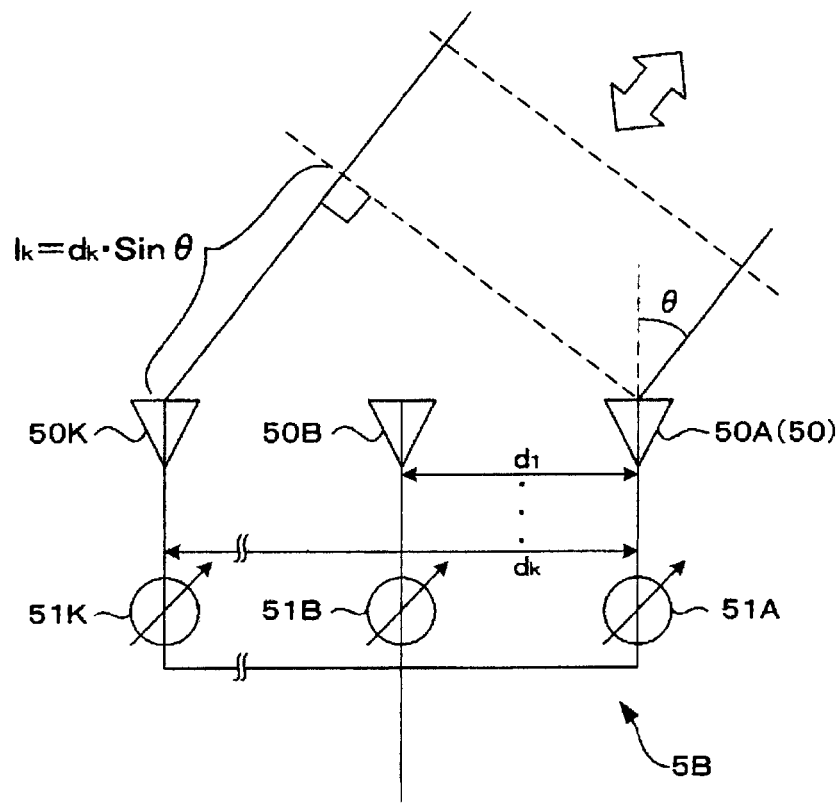
FIG. 11 is a schematic view showing an outline of a scan antenna.
Figure 12:
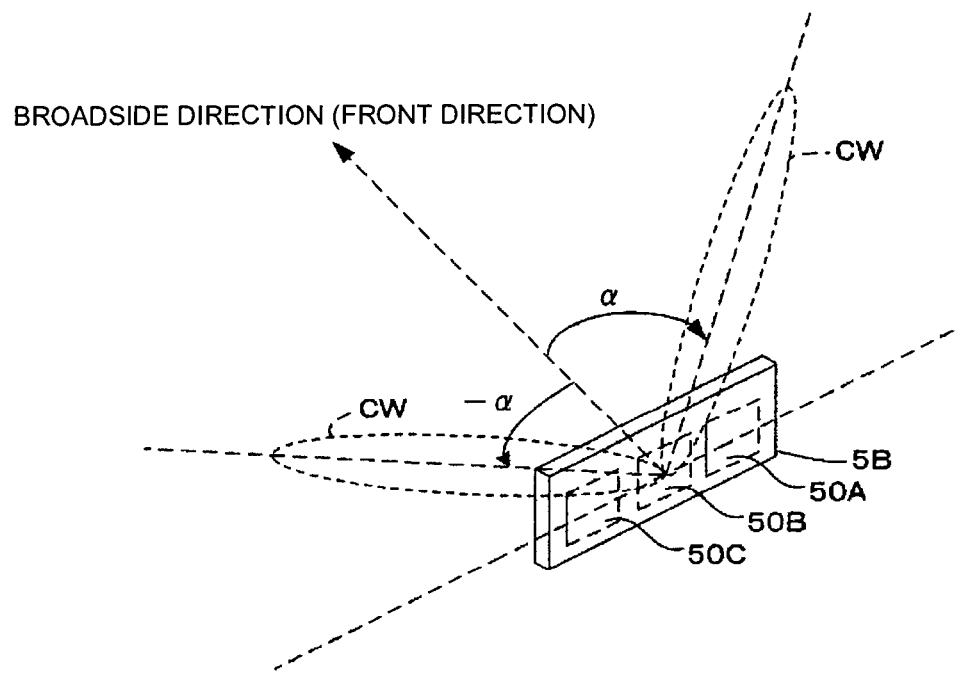
FIG. 12 is a schematic view showing a scanning state of the scan antenna.
Figure 13:
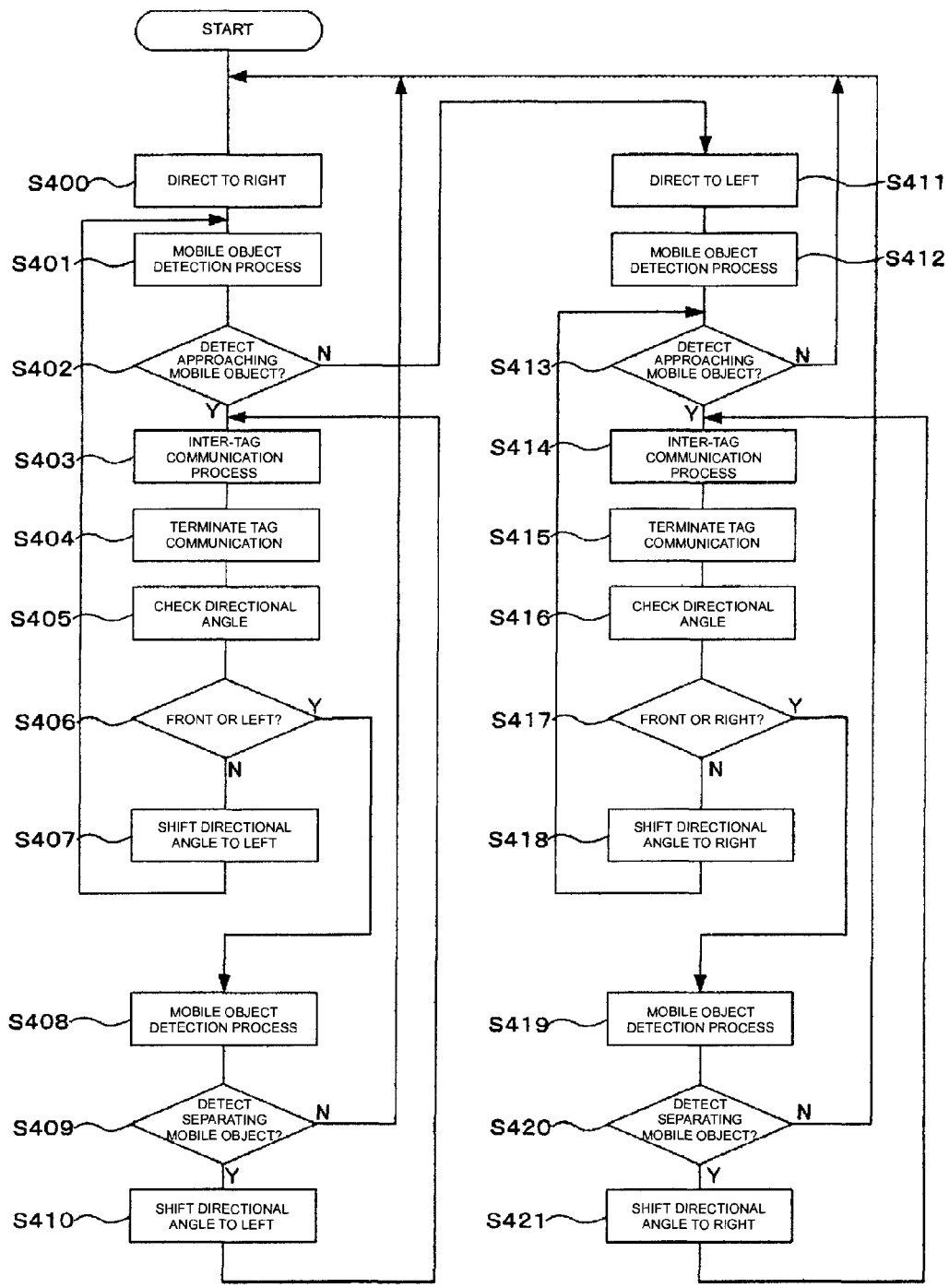
FIG. 13 is a flowchart showing a movement direction detection process of the cargo in the reader/writer.
Figure 14:
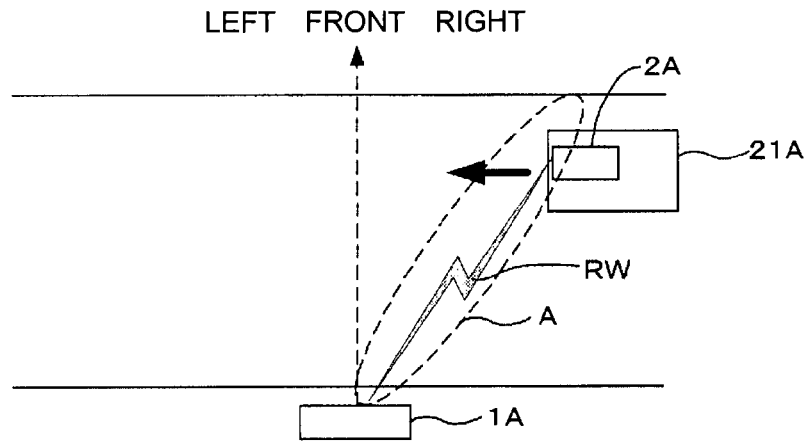
FIGS. 14(a) to 14(c) are schematic views each showing the communication state with the cargo with the tag attached after the reader/writer performs the movement direction detection process, where
Figure 14:
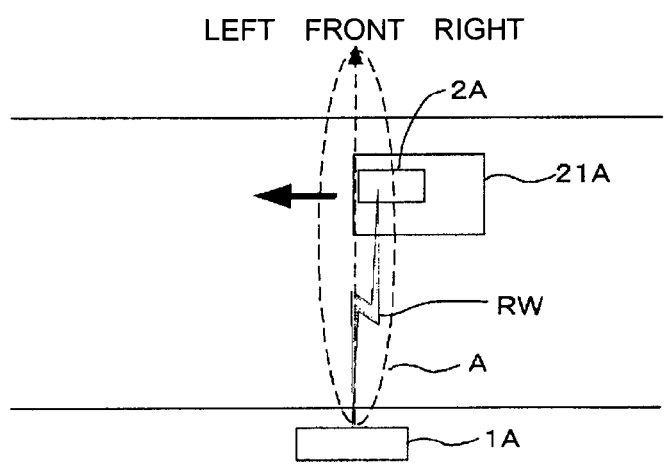
Figure 14:
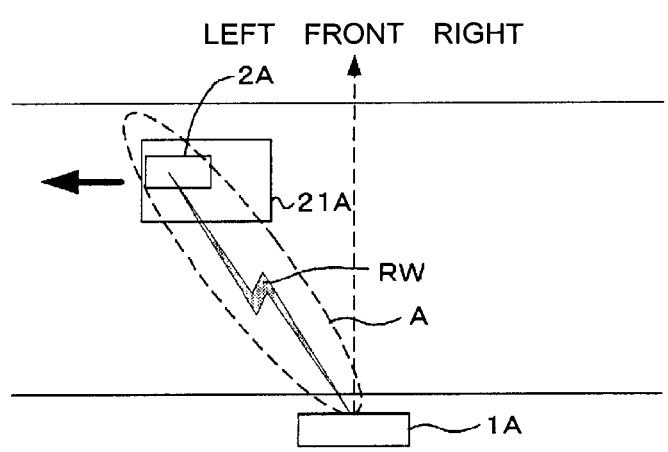

FIG. 10 is a block diagram showing a schematic configuration of the reader/writer 1B according to the fourth embodiment, FIG. 11 is a schematic view showing an outline of the scan antenna 5B, FIG. 12 is a schematic view showing a scanning state of the scan antenna 5B, FIG. 13 is a flowchart showing the movement direction detection process of the cargo 21A in the reader/writer 1B, and FIGS. 14(*a*) to 14(*c*) are schematic views showing the communication state with the cargo with the tag attached after the reader/writer 1B performs the movement direction detection process.

As shown in FIG. 10, the reader/writer 1B according to the fourth embodiment includes the Doppler modules 3A, 3B, the diplexer 4, the scan antenna 5B, the A/D converters 6A, 6B, the signal processing part 7, the tag communication control part 8, the transmitting/receiving part 9, and a scan antenna control part 10.

As shown in FIG. 12, the scan antenna 5B has a configuration in which a plurality of antenna elements 50 is linearly arrayed, and a variable phase shifter (phase shifter) 51 is connected to each antenna element 50. In FIG. 12, three antenna elements 50 are shown, but the number of antenna elements 50 is not limited to three. In addition, the antenna element 50 is not limited to being linearly arrayed, and may be arrayed two-dimensionally. The width of the beam narrows if the number of antenna elements 50 is increased. In the present embodiment, the beam is the transmission wave CW when performing the mobile object detection process, and is the interrogating wave RW when performing the inter-tag communication process.

The method of scanning in the beam direction at the scan antenna 5B will now be described with reference to FIG. 11.

When all antenna elements 50A, 50B, ... 50K transmit electrical waves at the same phase, the electrical wave radiated from the scan antenna 5B is propagated as a plane wave in a broadside direction (direction perpendicular to the array direction of the antenna elements 50A, 50B, ... 50K). The phase of the electrical wave transmitted by each antenna element 50A, 50B, ... 50K merely needs to be shifted so as to satisfy the following equation in order to incline the propagating direction of the electrical wave by an angle θ (rad) measured from the broadside direction.

As shown in FIG. 11, with the wavelength of the electrical wave that is transmitted or received as λ(m), the distance between the antenna element 50A, which is a reference, and the kth antenna element 50K as $d_k$(m), and the distance between the equal phase plane passing through the antenna element 50A, which is the reference, of the equal phase planes shown with a broken line in FIG. 11 and the kth antenna element 50K as $l_k$(m), the shift $\phi_k$ in phase of the kth antenna element 50K with respect to the phase of the antenna element 50A, which is the reference, is obtained with the following equation.

$$\phi_k = (l_k/\lambda) \times 2\pi = (d_k \times \sin\theta/\lambda) \times 2\pi \qquad \text{<Equation 4>}$$

The scan antenna 5B thus can direct the beam of the electrical wave in a target direction by shifting the phase of the signal such that each phase shifter 51A, 51B, ... 51K satisfies the above equation. When receiving the electrical wave, the direction of the received electrical wave can be determined by detecting the shift in phase of each antenna element 50A, 50B, ... 50K.

The tag communication control part 8 is a circuit that functions as the communication control means, similar to the above, and further functions as movement direction detection means herein, as described below.

The scan antenna control part 10 receives scan angle information from the tag communication control part 8 with respect to the scan antenna 5B. The scan antenna control part 10 then transmits a scan control signal to the scan antenna 5B based on the received scan angle information, and controls the direction of the beam of the electrical wave, that is, the transmission wave CW and the interrogating wave RW radiated from the scan antenna 5B. The scan angle is an inclination angle of the beam (transmission wave CW herein) measured with the broadside direction (direction perpendicular to the array direction of the antenna elements 50A, 50B, ... 50K) as a reference, as shown in FIG. 12. In the present embodiment, a clockwise direction (α) in the figure takes a +value, and a counterclockwise direction (−α) takes a −value. The scan angles α, −α may be set to the tag communication control part 8 in advance by the user.

The operation of the reader/writer 1B configured as above will now be described with reference to FIG. 13. FIG. 11 is a flowchart mainly showing the movement direction detection process. In the following, a case where the reader/writer 1B is installed along the conveying means such as the belt conveyor is shown, where an upstream side in a conveying direction is described as left, and a downstream side as right.

First, assume that the reader/writer 1B scans the transmission wave CW transmitted from the scan antenna 5B to the left and the right based on the preset scan angle. The speed and the scan angle upon this scan are stored in the tag communication control part 8 in advance. When the orientation of the scan antenna 5B is set toward the right (S400), the mobile object detection process is performed (S401). As a result, if the cargo 21A is detected (Y in S402), the reader/writer 1B performs the inter-tag communication process, that is, transmits the interrogating wave RW to the cargo 21A (S403), and then terminates the inter-tag communication process, that is, stops the transmission of the interrogating wave RW (S404). When transmitting the interrogating wave RW, the orientation of the scan antenna 5B is the same as the direction the transmission wave CW has been transmitted, and thus the directional angle when the interrogating wave RW is transmitted, that is, the scan angle when the transmission wave CW is transmitted is checked (S405).

Whether or not the orientation of the scan antenna 5B is facing the front or the left side is then checked (S406), and if neither, the directional angle is shifted to the left (S407). In this case, an amount of shift to the left may be set in the tag communication control part 8 in advance. The amount of shift may be appropriately set by the user from the movement speed of the cargo 21A, the beam width of the electrical wave transmitted from the scan antenna 5B, and the like. After the directional angle is shifted by a predetermined amount of shift, the process returns to the mobile object detection process (S401) to perform the mobile object detection process, and whether or not the cargo 21A is detected is checked (S402). If the cargo 21A is detected as a result (Y in S402), processes similar to the above, that is, the processes of S403 to S406 are performed, and if "N" in the process of S406, the directional angle is further shifted to the left. If the directional angle directed to the right side at the beginning gradually shifts to the left side, this means that the cargo 21A approaches the communication range A from the right side and moves toward the left side. Since the directional angle is set in the tag communication control part 8, the movement direction of the cargo 21A can be detected by calculating the shift direction of the directional angle in the tag communication control part 8.

The interrogating wave RW can be transmitted in accordance with the movement speed of the cargo 21A in the reader/writer 1B of the present embodiment by repeatedly performing the process of S406. This state is shown in FIGS. 14(*a*) to 14(*c*).

FIGS. 14(*a*) to 14(*c*) show a state where the cargo 21A passes the front of the reader/writer 1B from the right side and goes out from the left side passing the front of the reader/writer 1B. In this case, the movement direction of the cargo 21A and the scan direction of the interrogating wave RW by the scan antenna 5B coincide since the directional angle shifts such that the directional angle on the right side with respect to the front decreases by performing the process of S407, whereby the interrogating wave RW can be transmitted in accordance with the movement speed of the cargo 21B, as shown in FIGS. 14(*a*) to 14(*c*), by setting the amount of shift of the directional angle so as to accord with the movement speed of the cargo 21A.

In the state shown in FIG. 14(*a*), the cargo 21A is moved proximate to the communication range A. If detected two or more times by performing the mobile object detection process with the directional angle directed toward the right, this means that the cargo 21A is moving closer to the communication range A, as shown in FIG. 14(*a*). This is described as "(approaching) mobile object detection" as detection can be made in the process of S402.

In the state shown in FIGS. 14(*a*) to 14(*c*), the directional angle ultimately faces the front (Y in S406) when the directional angle check process (S406) is executed by repeatedly performing the process of shifting the directional angle to the left (S407). In other words, the orientation of the scan antenna 5B transitions to the state shown in FIG. 14(*b*). The mobile object detection process (S408) is further performed in this case, where if the cargo 21A is detected (Y in S409), the directional angle is shifted to the left (S410), the process returns to the process of S403, and after the inter-tag communication process (403), the tag communication terminating process (S404), and the directional angle check process (S405) are performed, the process of checking whether the directional angle is the front or the left is performed (S406). In the state shown in FIGS. 14(*a*) to 14(*c*), the directional angle is directed toward the left than the front (Y in S406) when such processes are performed, and further, the mobile object detection process (S408) similar to above, and the check process (S409) on the movement of the cargo 21A are performed. When such processes are repeatedly performed, the directional angle increases toward the left, so that detection can be made that the cargo 21A is moving away from the communication range A, as shown in FIG. 14(*c*), if increase towards the left of the directional angle is detected in the tag communication control part 8, similar to the above. This is described as "(separating) mobile object detection" as detection can be made in the process of S409.

If the mobile object is not detected (N in S402) as a result of performing the process of S400 and performing the mobile object detection process, the orientation of the scan antenna 5B is set toward the left (S411), and the movement direction detection process (S411) is performed. The subsequent processes are similar to the processes of S401 to S410 described above and differ only in that the shift direction is toward the right (S418, S421) and that the check is made on whether the directional angle is toward the front or the right (S417), and thus the description thereof will not be given. Similarly, if the cargo 21A is not detected, that is, the directional angle is shifted toward the left as in the states shown in FIGS. 14(*a*) to 14(*c*) and the movement of the cargo 21A is no longer detected by the reader/writer 1B as a result of repeatedly performing the processes of S402 to S410, the orientation of the scan antenna 5B is set to the direction of the leftward scan angle set in advance, and processes similar to the above are performed.

As described above, in the reader/writer 1B according to the fourth embodiment, the movement direction of the cargo 21A can be detected using the scan antenna 5B and the interrogating wave RW to be transmitted to the cargo 21A can be transmitted with the direction thereof according with the movement of the cargo 21A, in addition to the basic effects of the present invention. Thus, the communication time of the reader/writer 1B and the RFID tag 2A can be extended, the communication error can be prevented, and the disadvantage in managing entry/exit of cargo can be prevented.

The present invention allows the interrogating wave to be transmitted only when the mobile object is moving in the communication range, as described above. A method of separately using a sensor such as an optical sensor is considered for the method of detecting the mobile object, but a device is externally required apart from the tag communication device such as the reader/writer, or an external input or a specific communication command is required. In the present invention, however, a special input/output is not required since Doppler measurement is used.

The present invention enables communication with the object at the time the movement starts since the movement of the mobile object can be detected as long as it is in the communication range of the tag communication device even when the object stopped in the communication range starts to move. Numerous sensors need to be installed to cover the entire communication range of the tag communication device if such a system was to be implemented using the sensor such as the optical sensor, which leads to enlargement of the system and increase in cost. In the present invention, however, the electrical wave same as in the tag communication can be used for the detection of the mobile object, whereby the range substantially the same as the communication range can be covered with the same antenna, and thus the present invention excels in miniaturization of the system and in cost.

The invention claimed is:

1. A tag communication device for performing wireless communication with an RFID tag by transmitting an interrogating wave from an antenna to a mobile object with the RFID tag attached in a predetermined communication range, the tag communication device comprising:
   Doppler measurement means for obtaining a Doppler signal for every frequency from transmission waves with a plurality of frequencies and reflected waves thereof;
   phase difference detection means for detecting a phase difference of the Doppler signals of two frequencies of the Doppler signals for every frequency; and
   communication control means for controlling the transmission of the interrogating wave so as to transmit the interrogating wave when the phase difference is detected by the phase difference detection means, and so as not to transmit the interrogating wave when the phase difference is not detected by the phase difference detection means.

2. The tag communication device according to claim 1, further comprising:
   stop tag detection means for detecting presence of reception of a response wave with respect to the interrogating wave transmitted from the antenna when the phase difference is not detected by the phase difference detection means, and detecting that a stopped RFID tag is present in the predetermined communication range when the response wave is received; wherein
   the communication control means stops the transmission of the interrogating wave after the detection by the stop tag detection means.

3. The tag communication device according to claim 2, further comprising:
   distance calculating means for calculating a distance between the mobile object and the antenna from the phase difference detected by the phase difference detection means; and
   transmission power adjustment means for adjusting transmission power of the interrogating wave during the wireless communication according to the distance calculated by the distance calculation means.

4. The tag communication device according to claim 1, further comprising:
   tagless movement detection means for detecting presence of reception of a response wave with respect to the interrogating wave transmitted from the antenna after the phase difference is detected by the phase difference detection means, and detecting that the mobile object without the RFID tag attached moved in the predetermined communication range when the response wave is not received; wherein
   the communication control means stops the transmission of the interrogating wave after the detection by the tagless movement detection means.

5. The tag communication device according to claim 1, further comprising:
   distance calculating means for calculating a distance between the mobile object and the antenna from the phase difference detected by the phase difference detection means; and
   transmission power adjustment means for adjusting transmission power of the interrogating wave during the wireless communication according to the distance calculated by the distance calculation means.

6. The tag communication device according to claim 1, further comprising communication abnormality detection means for determining as a communication abnormality when the phase difference is detected by the phase difference detection means and the response wave is not received from the RFID tag.

7. The tag communication device according to claim 1, wherein
   the antenna is a scan antenna, including a plurality of antenna elements, for scanning a beam of the transmission wave;
   the device including scan antenna control means for controlling an orientation of the transmission wave based on a scan angle of the scan antenna;
   the communication control means acquires the scan angle of the scan antenna upon detection when the phase difference detection means detects the phase difference, and sets a directional angle of the interrogating wave according to the scan angle and transmits the interrogating wave; and
   the device further includes movement direction detection means for detecting a movement direction of the mobile object based on a transition of the directional angle.

8. The tag communication device according to claim 1, wherein the communication control means transitions a directional angle of the interrogating wave according to a movement direction detected by the movement direction detection means.

9. A tag communication device for performing wireless communication with an RFID tag by transmitting an interrogating wave from an antenna to a mobile object with the RFID tag attached in a predetermined communication range, the tag communication device comprising:
   first Doppler measurement means for obtaining a first Doppler signal from a transmission wave with a first frequency and a reflected wave thereof;
   second Doppler measurement means for obtaining a second Doppler signal from a transmission wave with a second frequency different from the first frequency and a reflected wave thereof;
   phase difference detection means for detecting a phase difference between the first Doppler signal and the second Doppler signal; and
   communication control means for controlling the transmission of the interrogating wave so as to transmit the interrogating wave when the phase difference is detected by the phase difference detection means, and so as not to transmit the interrogating wave when the phase difference is not detected by the phase difference detection means.

10. A tag communication method for performing wireless communication with an RFID tag by transmitting an interrogating wave from an antenna to a mobile object with the RFID tag attached in a predetermined communication range, the tag communication method comprising the steps of:
- a Doppler measurement step for obtaining a Doppler signal for every frequency from transmission waves with a plurality of frequencies and reflected waves thereof;
- a phase difference detection step for detecting a phase difference of the Doppler signals of two frequencies of the Doppler signals for every frequency; and
- communication control step for controlling the transmission of the interrogating wave so as to transmit the interrogating wave when the phase difference is detected by the phase difference detection step, and so as not to transmit the interrogating wave when the phase difference is not detected by the phase difference detection step.

11. The tag communication method according to claim 10, further comprising the step of:
- a stop tag detection step for detecting presence of reception of a response wave with respect to the interrogating wave transmitted from the antenna when the phase, difference is not detected by the phase difference detection step, and detecting that a stopped RFID tag is present in the predetermined communication range when the response wave is received; wherein
- the communication control step stops the transmission of the interrogating wave after the detection by the stop tag detection means.

12. The tag communication method according to claim 11, further comprising the steps of:
- a distance calculating step for calculating a distance between the mobile object and the antenna from the phase difference detected by the phase difference detection step; and
- a transmission power adjustment step for adjusting transmission power of the interrogating wave during the wireless communication according to the distance calculated by the distance calculation step.

13. The tag communication method according to claim 10, further comprising the step of:
- a tagless movement detection step for detecting presence of reception of a response wave with respect to the interrogating wave transmitted from the antenna after the phase difference is detected by the phase difference detection step, and detecting that the mobile object without the RFID tag attached moved in the predetermined communication range when the response wave is not received; wherein
- the communication control step stops the transmission of the interrogating wave after the detection by the tagless movement detection step.

14. The tag communication method according to claim 10, further comprising the steps of:
- a distance calculating step for calculating a distance between the mobile object and the antenna from the phase difference, detected by the phase difference detection step; and
- a transmission power adjustment step for adjusting transmission power of the interrogating wave during the wireless communication according to the distance calculated by the distance calculation step.

15. The tag communication method according to claim 10, further comprising the step of:
- a communication abnormality detection step for determining as a communication abnormality when the phase difference is detected by the phase difference detection step, and the response wave is not received from the RFID tag.

16. The tag communication method according to claim 10, wherein
- the antenna is a scan antenna, including a plurality of antenna elements, for scanning a beam of the transmission wave;
- the method includes a scan antenna control step for controlling an orientation of the transmission wave based on a scan angle of the scan antenna;
- the communication control step acquires the scan angle of the scan antenna upon detection when the phase difference is detected in the phase difference detection step, and sets a directional angle of the interrogating wave according to the scan angle and transmits the interrogating wave; and
- the method further includes detecting a movement direction of the mobile object based on a transition of the directional angle.

17. The tag communication method according to claim 10, wherein the communication control step transitions a directional angle of the interrogating wave according to a movement direction detected by the movement direction detection.

18. A tag communication method for performing wireless communication with an RFID tag by transmitting an interrogating wave from an antenna to a mobile object with the RFID tag attached in a predetermined communication range, the tag communication method comprising the steps of:
- a first Doppler measurement step for obtaining a first Doppler signal from a transmission wave with a first frequency and a reflected wave thereof;
- a second Doppler measurement step for obtaining a second Doppler signal from a transmission wave with a second frequency different from the first frequency and a reflected wave thereof;
- a phase difference detection step for detecting a phase difference between the first Doppler signal and the second Doppler signal; and
- a communication control step for controlling the transmission of the interrogating wave so as to transmit the interrogating wave when the phase difference is detected by the phase difference detection step, and so as not to transmit the interrogating wave when the phase difference is not detected by the phase difference detection step.

* * * * *